G. G. WHITNEY.
SHAFT BEARING.
APPLICATION FILED APR. 14, 1916.
1,193,648.
Patented Aug. 8, 1916.
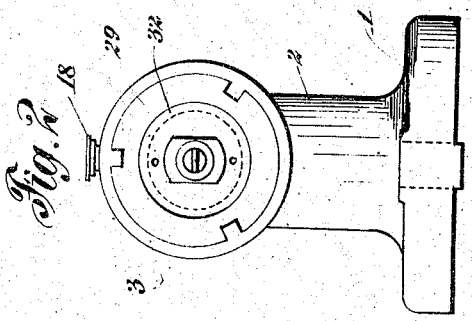
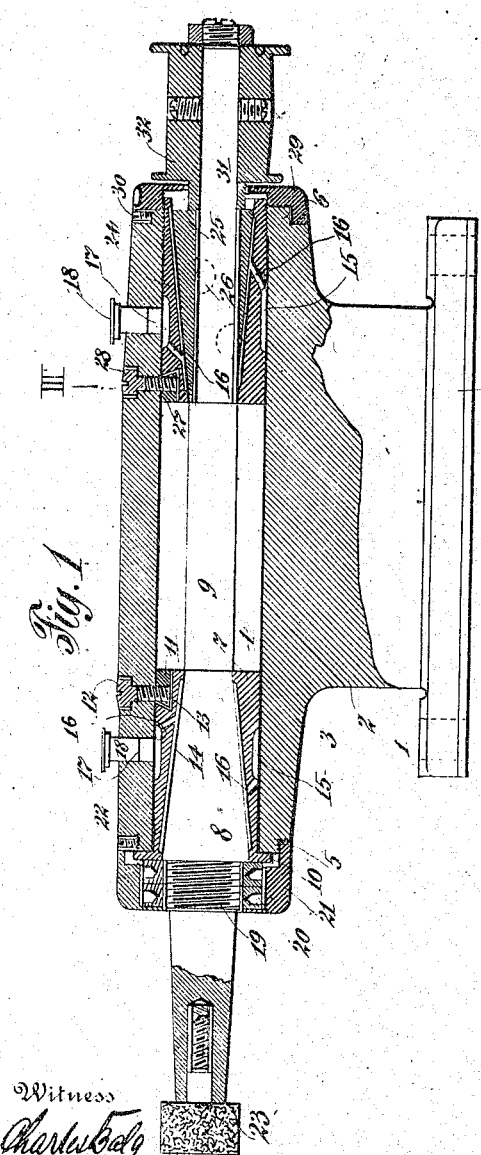
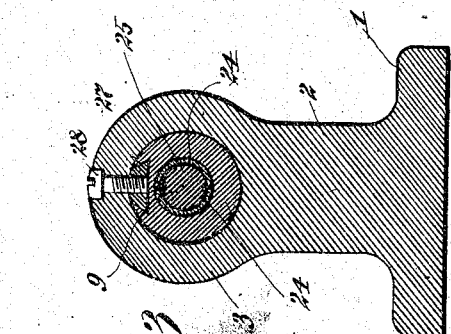
Witness
Charles Edg
Karl H. Butler
Inventor
George G. Whitney
By
Attorneys

UNITED STATES PATENT OFFICE.

GEORGE G. WHITNEY, OF DETROIT, MICHIGAN.

SHAFT-BEARING.

1,193,648.  Specification of Letters Patent.  Patented Aug. 8, 1916.

Application filed April 14, 1916. Serial No. 91,001.

*To all whom it may concern:*

Be it known that I, GEORGE G. WHITNEY, a citizen of the United States of America, residing ⁀‿ Detroit, in the county of Wayne and State of Michigan, have invented certain new and useful Improvements in Shaft-Bearings, of which the following is a specification, reference being had therein to the accompanying drawings.

This invention relates to shaft bearings, and one of the features of my invention includes conical members which may be easily and quickly adjusted to compensate for wear and provide an accurate and true journal for a shaft relative to a piece of work or adjacent parts of a machine.

Another feature of my invention is that of a thorough lubrication for the journal members of the bearing, and this and other features are best exemplified in a grinder head which requires a true and accurate spindle and bearing.

Grinder heads, as a general rule, are subjected to stresses and strains which tend to unevenly wear the bearings of the spindle or shaft of the grinder head, and besides compensating for such wear, my invention aims to insure a nonfrictional rotation of the grinder shaft in its bearings and to provide for expansion due to overheating.

My invention is further characterized by parts that are easy to assemble, durable, inexpensive to manufacture and highly efficient as a bearing.

My invention will be hereinafter described and then claimed, and reference will now be had to the drawing, wherein—

Figure 1 is a longitudinal sectional view of a grinder head embodying features of my invention; Fig. 2 is an end view of the same; and Fig. 3 is a cross sectional view taken on or about the line III—III of Fig. 1.

In describing my invention by aid of the views above referred to, I desire to point out that a grinder head is shown for convenience of illustration of the invention, and I do not confine my invention to the application illustrated or the precise construction and arrangement of parts shown. The following description is therefore to be broadly construed as including substitute constructions and arrangements of parts within the scope of the appended claims.

In the drawing, 1 denotes a base having a pedestal 2 provided with a barrel or housing 3, said barrel having a longitudinal bore 4 and reduced ends 5 and 6 one of which is exteriorly screwthreaded. In one end of the barrel 3 is mounted a spindle bushing 7 having a tapering bore to receive a conical portion or fixed cone member 8 of a wheel spindle or shaft 9, said spindle extending through the bore 4 of the barrel. The outer end of the spindle bushing 7 has a peripheral flange 10 abutting the reduced end 5 of the barrel 3 and said bushing is held against longitudinal or rotative movement by a dovetail block 11 and a binding screw 12 the head of which is countersunk in the barrel 3, said dovetail member fitting in a dovetail recess 13 provided therefor in the inner end of the bushing 7. This bushing constitutes an end thrust bearing and the bore of said bushing has longitudinal lubricant grooves 14 in communication with an annular channel 15 in the periphery of said bushing, through the medium of ports 16. The barrel 3 has a filling opening 17 in communication with the channel 15, and this opening may be provided with an oil or grease cup 18 serving as a reservoir for the channel 15.

The shaft 9, adjacent the large end of the conical portion 8 thereof, has a threaded portion 19 for nuts 20 and these nuts are inclosed by a dust cap 21 screwed upon the reduced end 5 of the barrel 3 and retained thereon by a set screw 22. From the threaded portion 19 the shaft 9 gradually tapers to a grinding wheel 23 mounted upon the end of the shaft and retained thereon in the usual and well known manner. In the opposite end of the barrel 3 is mounted a bushing 24 having a bore tapered oppositely to the bore of the bushing 7, each bushing being set with the large end of its bore facing outwardly, and in this bore is placed a cone member 25 keyed as at 26, or otherwise secured upon the shaft 9. This cone member 25 is adapted to freely revolve in the bushing 24 which forms a bearing surface therefor and the contacting faces of said members are lubricated through the medium of grooves, ports and channels, similar to the lubrication of the bushing 7. The bushing 24 is held against rotation or longitudinal movement by a dovetail block 27 and a binding screw 28 engaging a screwthreaded opening in the barrel and a like opening in the block. The end of the bushing 24 protrudes from the reduced end 6 of the barrel 3 and is externally screwthreaded to receive an adjusting ring 29 embracing the reduced end of the barrel and locked in adjusted position thereon by a set screw 30. Said ring abuts the end of the barrel between said end and the hub portion 31 of a pulley or power wheel 32 mounted upon the protruding end of the spindle or shaft 9.

To take up the wear of the bearing surfaces so that said spindle will run true and without vibration at very high speeds, adjustments may be made from time to time in the following manner. The dust cap 21 is first removed and the nuts 20 loosened sufficiently to permit of a slight endwise movement of said spindle. The binding screw 28 is then loosened to release the block 27 sufficiently to permit a longitudinal movement of the bushing 24 and the screw 30 removed to permit of the rotation of the adjusting ring 29. Said adjusting ring is then turned and by reason of its screwthreaded engagement with the projecting end of the bushing 24 and its abutting relation to the end of the barrel, will pull outwardly on the bushing, and because of the outwardly increasing diameter of the bore of said bushing, the same will be brought into contact with its cone member 25 to take up the wear between them. The longitudinal movement of the bushing 24 into contact with its cone which is fixed on the spindle, will move said spindle endwise, carrying its cone portion 8 into contact with the bushing 7 and taking up the play between these surfaces simultaneously with the adjustment of the bushing 24. The accurate adjustment of both bearings is thus accomplished by the turning of the single adjusting ring 29, and after the adjustment is made, said ring is then locked in adjusted position by the set screw 30 and the nuts 20 are again turned up against the flange 10 of the bushing 7 and the cap secured in place.

The conical portion 8 of the spindle being opposed to the cone member 25 with the end of largest diameter of each member at the outer ends of their bearings, should the spindle become overheated from any cause, the resultant endwise expansion of the shaft and cones will not cause the cones to bind in their bushings but such expansion will tend to make the bearings run more freely, thus greatly reducing friction and tending to overcome the difficulty. These conical surfaces are preferably made with a taper of 7.5 degrees, or more, so that they will not set up hard or stick in their bushings and prevent rotation of the spindle. The arrangement of spaced cone bearings insures true and accurate rotation of the spindle, preventing vibration at very high speeds and eliminating all endwise movement, the endwise as well as lateral play due to wear being accurately taken up by the turning of the adjusting ring.

My invention is not necessarily limited to the application of power to one end of the shaft, as the central portion of the barrel 3 may be cut away to permit of power being applied between the journal members of the bearing.

What I claim is:—

1. In a shaft bearing, a barrel, a shaft therein, reversely disposed conical members on said shaft, bushings in the ends of said barrel to receive said conical members and an adjusting member on one end of said barrel connected to one of said bushings adapted for adjustment to move said conical members and said shaft.

2. In a shaft bearing, a barrel, a shaft therein, reversely disposed conical members on said shaft, bushings in the ends of said barrel to receive the conical members and capable of longitudinal movement in said barrel, nuts on said shaft at one end of the barrel adapted to be loosened to permit longitudinal movement of said shaft, and an adjusting member engaging the bushing at the opposite end of said barrel adapted to be rotated to shift said bushing toward its cone member and said shaft and other cone member in the same direction.

In testimony whereof I affix my signature in the presence of two witnesses.

GEORGE G. WHITNEY.

Witnesses:
 ANNA M. DORR,
 ESTHER M. BENSON.